US008217980B2

(12) United States Patent
Tanimura

(10) Patent No.: US 8,217,980 B2
(45) Date of Patent: Jul. 10, 2012

(54) MULTI-BEAM OPTICAL SCANNING DEVICE AND IMAGE FORMING APPARATUS USING THE SAME

(75) Inventor: Ken Tanimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 721 days.

(21) Appl. No.: 12/268,781

(22) Filed: Nov. 11, 2008

(65) Prior Publication Data

US 2009/0123179 A1 May 14, 2009

(30) Foreign Application Priority Data

Nov. 14, 2007 (JP) ................................. 2007-295344

(51) Int. Cl.
*B41J 15/14* (2006.01)
*B41J 27/00* (2006.01)
(52) U.S. Cl. ....................... 347/244; 347/258
(58) Field of Classification Search ................. 359/206; 347/244, 258
See application file for complete search history.

(56) References Cited

U.S. PATENT DOCUMENTS

| 5,812,181 | A  | * | 9/1998  | Ishibe         | 347/258 |
|-----------|----|---|---------|----------------|---------|
| 5,818,505 | A  | * | 10/1998 | Kato           | 347/258 |
| 6,643,043 | B2 |   | 11/2003 | Kato           | 359/206 |
| 7,034,859 | B2 | * | 4/2006  | Ishihara et al.| 347/244 |
| 2006/0250673 | A1 | * | 11/2006 | Kudo        | 359/205 |

FOREIGN PATENT DOCUMENTS

| JP | 2000-292718 | 10/2000 |
| JP | 2001-133711 | 5/2001  |
| JP | 2004-70108  | 3/2004  |

OTHER PUBLICATIONS

U.S. Appl. No. 12/354,581, filed Jan. 15, 2009, by Ken Tanimura and Manabu Kato.
U.S. Appl. No. 12/268,913, filed Nov. 11, 2008 by Yuichi Tomioka.

* cited by examiner

*Primary Examiner* — Ryan Lepisto
*Assistant Examiner* — Erin Chiem
(74) *Attorney, Agent, or Firm* — Fitzpatrick, Cella, Harper & Scinto

(57) ABSTRACT

A multi-beam optical scanning device includes a light source device, a deflector for deflecting a plurality of light beams from the light source device, and an imaging optical system for imaging a plurality of light beams deflected by the deflector upon a photosensitive drum, wherein a plurality of light beams, when they pass through an imaging optical element having a largest positive power in the sub-scan direction, pass through positions which are spaced apart from each other in the sub-scan direction, and wherein the photosensitive drum is so disposed that, when, among the plurality of light beams passing through the imaging optical element having a largest positive power in the sub-scan direction, a light beam which passes through a position furthermost in the sub-scan direction from a meridional of the imaging optical element having a largest positive power in the sub-scan direction is incident on the photosensitive drum, an incidence angle thereof in the sub-scan direction with respect to a surface normal of the photosensitive drum becomes smallest as compared with the other light beam or beams.

14 Claims, 13 Drawing Sheets

MULTI-BEAM OPTICAL SCANNING DEVICE AND IMAGE FORMING APPARATUS USING THE SAME

FIELD OF THE INVENTION AND RELATED ART

This invention relates to an optical scanning device and an image forming apparatus using the same.

Particularly, the present invention is suitably usable in an image forming apparatus such as a laser beam printer, a digital copying machine or a multifunction printer, for example, having an electrophotographic process.

Conventionally, in optical scanning devices such as a laser beam printer (LBP), for example, a Light beam (beam) being optically modulated in accordance with an imagewise signal and emitted from light source means is periodically deflected by deflecting means comprising a rotary polygonal mirror (polygon mirror).

Then, the scanningly deflected light beam is converged into a spot shape on a photosensitive recording medium (photosensitive drum) surface by an imaging optical system having a fθ characteristic, whereby the surface is optically scanned and image recording is performed thereon.

FIG. 15 is a schematic diagram of a main portion of a conventional optical scanning device.

In the drawing, a divergent light beam emitted from light source means 91 is converted into a parallel light beam by a collimator lens 92. Then, while being restricted by a stop 93, the light beam is incident on a cylindrical lens 94 having a refracting power only in the sub-scan direction (in the sub-scan section).

With respect to the main-scan direction (within the main-scan section), the parallel light beam incident on the cylindrical lens 94 goes out of the same while being unchanged at all.

On the other hand, within the sub-scan section, it is converged such that it is imaged as a line image on a deflecting surface (reflection surface) 95a of deflecting means 95 which comprises a rotary polygonal mirror.

Then, the light beam deflected be the deflecting surface 95a of the deflecting means 95 is directed onto a photosensitive drum surface 98 which is a scan surface to be scanned, through an imaging optical system 96 having a fθ characteristic.

Then, by rotating the deflecting means 95 in the direction of an arrow A, the photosensitive drum surface 98 is optically scanned in the direction of an arrow B and imagewise information is recorded thereon.

The optical scanning device described above is provided with a synchronism detecting sensor 99 as a photodetector, in order to adjust the timing of stating the image formation on the photosensitive drum surface 98, before scanning the photosensitive drum surface 98 with the light spot.

This synchronism detecting sensor 99 receives a synchronism detecting light beam which is a portion of the light beam scanningly deflected by the deflecting means 5, namely, the light beam as the same is scanning a region outside an image forming area on the photosensitive drum surface 98, before scanning that image forming area.

This synchronism detecting light beam is reflected by a synchronism detecting mirror 97 and then it is collected by a synchronism detecting lens (not shown), and finally it is incident on the synchronism detecting sensor 99.

Then, a synchronism detecting signal (synchronizing signal) is detected from an output signal of this synchronism detecting sensor 99 and, based on this synchronism detecting signal, the start timing of the image recording on the photosensitive drum surface 98 is controlled.

The imaging optical system 96 shown in the drawing is so configured to provide a conjugate relationship in the sub-scan section between the deflecting surface 95a of the deflecting means 95 and the photosensitive drum surface 98. With this arrangement, the surface tilt of deflecting surface 95a is compensated.

In relation to optical scanning devices such as described above, printing machines having faster printing speed have been desired for years.

An example is that a higher printing speed has been accomplished by a multiple-beam process: that is, using a multi-laser source; beam combining by a prism; or projecting a plurality of light beams onto a polygon mirror as an optical deflector at different angles with respect to the deflecting direction.

However, with regard to such multi-beam method, some problems to be mentioned below are known (see patent documents Nos. 1 and 2, below).

Due to the phenomenon of jitter which occurs when a light beam is obliquely incident on a photosensitive drum surface with respect to a normal thereto, or to a difference in variation of the wavelength of light beams resulting from any environmental variation or dispersion of the initial wavelengths of the light beams, jitter is produced in the main-scan direction which seriously deteriorates the print precision.

Furthermore, as marketplace needs, compactification (particularly, thinner thickness) of the optical scanning device (color LBP or copying machine) has been desired.

For making the thickness thinner, an optical system called an oblique incidence optical system wherein a light beam is incident on a deflecting surface of deflecting means from an oblique direction in the sub-scan section may be used, by which the degree of freedom for the path turning can be improved (see patent document No. 3).

[Patent Documents]
1. Japanese Laid-Open Patent Application No. 2001-133711
2. Japanese Laid-Open Patent Application No. 2000-292718
3. Japanese Laid-Open Patent Application No. 2004-70108

SUMMARY OF THE INVENTION

In an oblique incidence optical system, use of the multi-beam method based on multiple beams or beam combining means has caused an extra jitter due to a different factor, in addition to the jitter mentioned above.

When multiple beams are scanned on a photosensitive drum, a plurality of light beams (light rays) are scanned on the photosensitive drum at a predetermined pitch in the sub-scan direction according to a predetermined resolution.

This necessitates that a plurality of light beams pass through an imaging optical system in a state in which these light beams are spaced apart from each other in the sub-scan direction.

In the case of conventional optical systems in which light beams pass through an area around a meridional, including the optical axis of the imaging optical system, even if the light beams go through a lens in a state in which these are spaced apart from each other in the sub-scan direction as described above, there light beams advance in a symmetric state in the sub-scan direction relative to the meridional of the imaging optical system.

Therefore, no large difference is caused in the angle of passage and the position of passage of the light beams relative to the lens surface of an imaging lens constituting the imaging optical system. Hence, for the light beams passing through the imaging optical system, the same optical performance can be provided with respect to the main-scan direction.

On the other hand, in the case of oblique incidence optical systems, it is known that the light beams pass through separate positions which are spaced apart from each other in the sub-scan direction, relative to the meridional of the lens surface of the imaging lens which constitutes the imaging optical system.

If in such optical system a plurality of light beam spaced apart from each other in the sub-scan direction pass therethrough, since the position and angle of passage, in the sub-scan direction, of the light beams passing through the lens surface are different, the optical performance in the main-scan direction provided to the plurality of light beams passing through the imaging optical system is extremely different. As a result, in addition to the jitter mentioned hereinbefore, additional jitter will be generated in the main-scan direction.

The present invention provides a multi-beam optical scanning device of compact size, by which image deterioration can be suppressed and high speed printing can be achieved, and also an image forming apparatus having such optical scanning device.

In accordance with an aspect of the present invention, there is provided a multi-beam optical scanning device, comprising: light source means; deflecting means configured to scanningly deflect a plurality of light beams emitted from said light source means; and an imaging optical system configured to image a plurality of light beams scanningly deflected by a deflecting surface of said deflecting means, upon a photosensitive drum, wherein each of a plurality of light beams incident on an imaging optical element of imaging optical elements constituting said imaging optical system, which imaging optical element has a largest positive power in a sub-scan direction among the imaging optical elements, is deviated in one direction along the sub-scan direction relative to an optical axis of the imaging optical element having a largest positive power in the sub-scan direction, and the plurality of light beams, when they pass through the imaging optical element having a largest positive power in the sub-scan direction, pass through positions which are spaced apart from each other in the sub-scan direction; wherein at least one surface of the imaging optical element having a largest positive power in the sub-scan direction has a curvature in the sub-scan direction which curvature changes from an axial position toward an abaxial position; and wherein said photosensitive drum is so disposed that, when, among the plurality of light beams passing through the imaging optical element having a largest positive power in the sub-scan direction, a light beam which passes through a position furthermost in the sub-scan direction from a meridional of the imaging optical element having a largest positive power in the sub-scan direction is incident on said photosensitive drum, an incidence angle thereof in the sub-scan direction with respect to a surface normal of said photosensitive drum becomes smallest as compared with the other light beam or beams.

In one preferred form of this aspect of the present invention, where a maximum angle in a main-scan direction as the plurality of light beams pass through said imaging optical system and incident on said photosensitive drum is denoted by $\alpha$, a mean of incidence angles in the sub-scan direction as the plurality of light beams are incident with respect to a surface normal of said photosensitive drum is denoted by $\theta_0$, a pixel density is denoted by DPI, an amount of jitter in the main-scan direction caused, when the plurality of light beams pass through the imaging optical element, by the passage of the plurality of light beams through positions which are spaced apart from each other in the sub-scan direction is denoted by $\Delta J$ (mm), a relation $$|\Delta J \times DPI/25.4 + \sin\theta_0 \tan\alpha| \leq 0.1$$

is satisfied.

In the sub-scan section, the plurality of light beams incident on the deflecting surface of said deflecting means may be incident from an oblique direction with respect to the deflecting surface.

The multi-beam optical scanning device may include a plurality of photosensitive drums and a plurality of light source means corresponding to said plurality of photosensitive drums, respectively, wherein said multi-beam optical scanning device may further comprise reflecting mirrors disposed at light paths for directing a plurality of light beams emitted from said plurality of light source means to associated photosensitive drums, respectively, and wherein, in accordance with a difference in the number of reflecting mirrors disposed at the light paths, a direction in which each of said plurality of light source means may be rotated around an optical axis is determined.

A plurality of light beams incident on said plurality of photosensitive drums may be incident thereon all in the same order with respect to the direction of rotation of the photosensitive drums.

The difference in the number of reflecting mirrors disposed at the light paths may be an odd number.

In accordance with another aspect of the present invention, there is provided a multi-beam optical scanning device, comprising: light source means; deflecting means configured to scanningly deflect a plurality of light beams emitted from said light source means; and an imaging optical system configured to image a plurality of light beams scanningly deflected by a deflecting surface of said deflecting means, upon a photosensitive drum, wherein each of a plurality of light beams incident on an imaging optical element constituting said imaging optical system is deviated in one direction along the sub-scan direction with respect to an optical axis of said imaging optical system, and each of the plurality of light beams, when they pass through the imaging optical element, pass through positions which are spaced apart from each other in the sub-scan direction, wherien at least one surface of the imaging optical element has a curvature in the sub-scan direction which curvature changes from an axial position toward an abaxial position; and wherein said photosensitive drum is so disposed that, when, among the plurality of light beams passing through the imaging optical element, a light beam which passes through a position furthermost in the sub-scan direction from a meridional of the imaging optical element is incident on said photosensitive drum, an incidence angle thereof in the sub-scan direction with respect to a surface normal of said photosensitive drum becomes smallest as compared with the other light beam or beams.

In one preferred form of this aspect of the present invention, where a maximum angle in a main-scan direction as the plurality of light beams pass through said imaging optical system and incident on said photosensitive drum is denoted by $\alpha$, a mean of incidence angles in the sub-scan direction as the plurality of light beams are incident with respect to a surface normal of said photosensitive drum is denoted by $\theta_0$, a pixel density is denoted by DPI, an amount of jitter in the main-scan direction caused, when the plurality of light beams pass through the imaging optical element, by the passage of the plurality of light beams through positions which are spaced apart from each other in the sub-scan direction is denoted by $\Delta J$ (mm), a relation $|\Delta J \times DPI/25.4 + \sin\theta_0 \tan\alpha| \leq 0.1$ is satisfied.

In accordance with a further aspect of the present invention, there is provided an image forming apparatus, comprising: a multi-beam optical scanning device as recited above; a photosensitive member disposed at a surface to be scanned; a developing device for developing an electrostatic latent image formed on said photosensitive member with a light beam scanningly deflected by said multi-beam optical scanning device, to produce a toner image; a transferring device for transferring the developed toner image onto a transfer material; and a fixing device for fixing the transferred toner image, on the transfer material.

In accordance with a yet further aspect of the present invention, there is provided an image forming apparatus, comprising: a multi-beam optical scanning device as recited above 1; and a printer controller for converting code data supplied from an outside machine into an imagewise signal and for inputting the imagewise signal into said optical scanning device.

In accordance with a still further aspect of the present invention, there is provided a color image forming apparatus, comprising: a multi-beam optical scanning device as recited in above; and a plurality of image bearing members each being disposed at a surface to be scanned by said multi-beam optical scanning device, for forming images of different colors.

The color image forming apparatus may further comprise a printer controller for converting a color signal supplied from an outside machine into imagewise data of different colors and for inputting the imagewise data into corresponding multi-beam optical scanning devices.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

An imaging optical system which constitutes a multi-beam optical scanning device according to an embodiment of the present invention is so configured that the power (refracting power) in the sub-scan direction is set to provide a uniform imaging magnification in the sub-scan direction, within an image effective region.

Figure 1A:
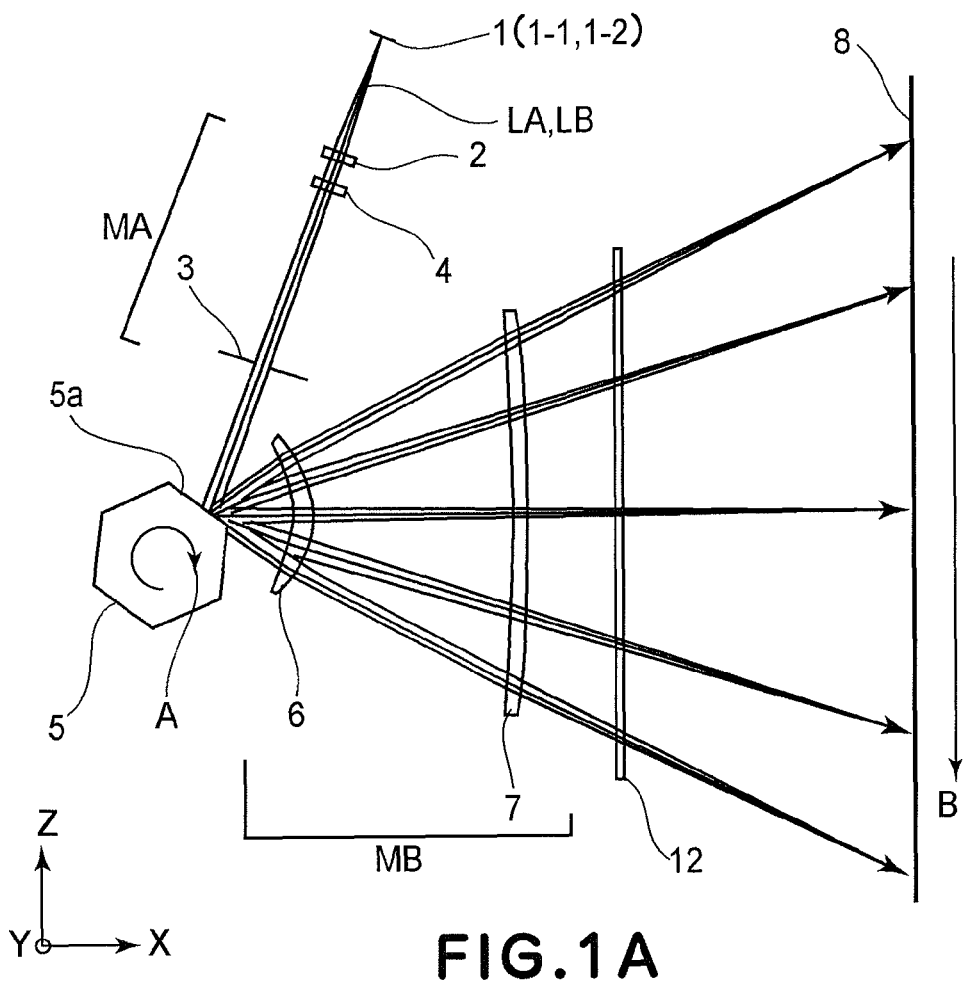
FIG. 1A is a main-scan sectional view of a first embodiment of the present invention.

FIG. 1A is a sectional view (main-scan sectional view) of a main portion of a first embodiment of the present invention, along a main-scan direction.

Figure 1B:
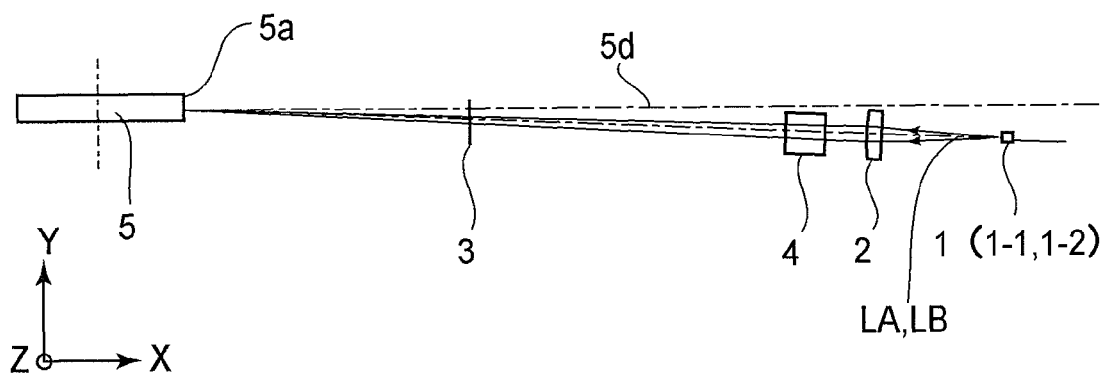
FIG. 1B is a sub-scan sectional view of an input optical system according to the first embodiment of the present invention.

FIG. 1B is a sectional view (sub-scan sectional view) of a main portion of the first embodiment of the present invention, along a sub-scan direction.

Figure 1C:
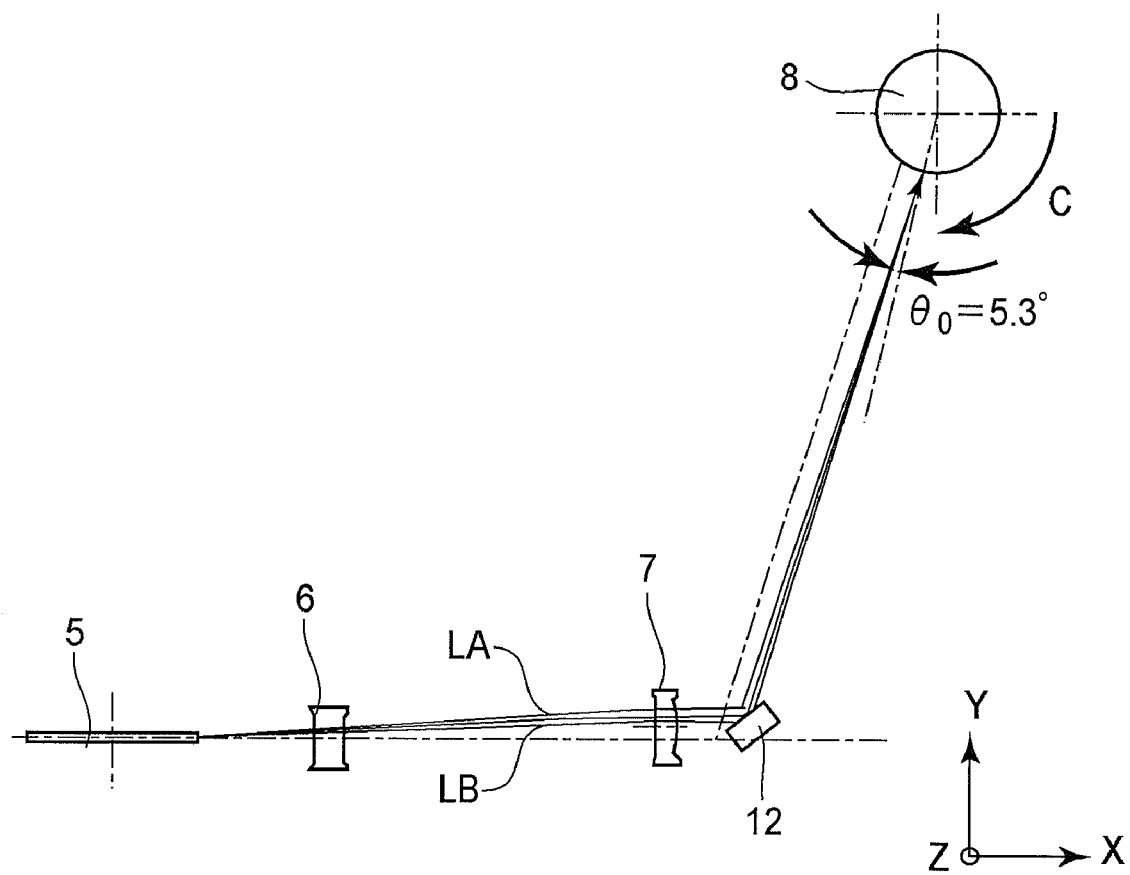
FIG. 1C is a sub-scan sectional view of an imaging optical system according to the first embodiment of the present invention.

FIG. 1C is a sectional view (sub-scan sectional view) of a main portion of an imaging optical system according to the first embodiment of the present invention, along a sub-scan direction.

It should be noted that, in the following description, the term "main-scan direction" (Y-direction) refers to a direction in which a light beam is scanningly deflected by a deflecting surface of deflecting means.

The term "sub-scan direction" (Z-direction) refers to a direction which is parallel to the rotational axis of the deflecting means.

The term "main-scan section" refers to a plane with respect to which the sub-scan direction (Z-direction) is a normal.

The term "sub-scan section" refers to a plane with respect to which the main-scan direction (Y-direction) is a normal.

Denoted in the diagrams at 1 is light source means. For example, it comprises a semiconductor laser (laser source).

The semiconductor laser 1 has two light emitting members (laser light emitting members) 1-1 and 1-2 (monolithic multibeam laser).

Denoted at 2 is a condenser lens (collimator lens) which serves to convert two divergent light beams LA and LB emitted from the two light emitting members 1-1 and 1-2 into parallel light beams.

Denoted at 4 is a cylindrical lens which has a refracting power (power) only in the sub-scan direction (the sub-scan section).

Denoted at 3 is an aperture stop which functions to regulate the beam profile of the two light beams LA and LB from the cylindrical lens.

The elements of the collimator lens 2, cylindrical lens 4 and aperture stop 3 mentioned above are components of an input optical system MA.

The input optical system MA of the present embodiment functions to convert a plurality of light beams emitted from the light source means 1 and to image them along a straight line on the deflecting surface 5a of the deflecting means 5 to be described later.

Furthermore, the collimator lens 2 and the cylindrical lens 4 may be constituted by a single optical element (anamorphic optical element).

Denoted at 5 is an optical deflector as the deflecting means. It comprises a rotary polygonal mirror (polygon mirror), for example, and it is rotated at a constant speed in the direction of an arrow A in the drawing by driving means (not shown) such as a motor.

Denoted at MB is an imaging optical system having an fθ characteristic (fθ lens system). It comprises first and second imaging lenses (toric lenses) 6 and 7 which are refractive lenses as imaging optical elements.

The imaging optical system MB serves to image a plurality of light beams scanningly deflected by the deflecting means 5 at different positions on a photosensitive drum surface 8 to be described later.

Furthermore, the imaging optical system MB is configured to provide a conjugate relationship in the sub-scan section between the deflecting surface 5a of the polygon mirror 5 and the photosensitive drum surface 8, thereby to achieve surface tilt compensation for the deflecting surface.

Denoted at 8 is a photosensitive drum (photosensitive drum surface) as a recording medium.

Denoted at 12 is a reflecting mirror which is disposed along a light path for directing two light beams LA and LB emitted from light source means 1, toward the photosensitive drum surface 8.

In the present embodiment, the two divergent light beams LA and LB emitted from the light source means 1 are converted into parallel light beams by the collimator lens 2.

The thus converted parallel light beams are imaged on the deflecting surface 5a of the polygon mirror 5 as elongated line images in the main-scan direction, by means of the cylindrical lens 4 which has a power only in the sub-scan section.

Furthermore, the two light beams LA and LB passed through the cylindrical lens 4 go through the aperture stop 3 by which the light beam width is restricted.

In this embodiment, in the sub-scan section, the optical axis of the collimator lens 2 and the optical axis of the cylindrical lens 4 are disposed inclined relative to a normal 5d to the deflecting surface 5a of the polygon mirror (optical deflector) 5.

With this arrangement, it is assured that the two light beams LA and LB emitted from the light emitting members 1-1 and 1-2, respectively, are incident on the deflecting surface 5a of polygon mirror 5 from an oblique direction (oblique incidence) in the sub-scan direction (i.e. oblique incidence optical system).

Then, the two light beams LA and LB scanningly deflected by the deflecting surface 5a of the polygon mirror 5 are imaged in the shape of a spot upon the photosensitive drum surface 8, by means of the imaging optical system MB and via a reflecting mirror 12.

Then, by rotating the polygon mirror 5 in the direction of an arrow A, the photosensitive drum surface 8 is optically scanned in the direction of an arrow B. Thus, two scanning lines are defined, and the image recording is performed based on it.

Here, with regard to the oblique incidence optical system, the reason why the optical performance difference occurs when light beams (light rays) being spaced apart from each other in the sub-scan direction pass through a lens surface, will be explained.

In the main-scan direction, as compared with the optical path length of the light beam which passes through the image center, the optical path length of the light beam which passes through an end portion of the image is longer.

Therefore, in an optical system having a surface tilt compensation function, in order to assure that a conjugate relationship is satisfied throughout the whole area of the scan region, the power of the lens in the sub-scan direction for which the light beam passes through the image end portion becomes smaller than the power of the lens in the sub-scan direction for which the light beam passes through the image center.

Hence, there is a tendency that the curvature radius of the lens surface in the sub-scan direction is gradually loosened, from the lens optical axis to the lens peripheral edge portion.

Figure 2A:
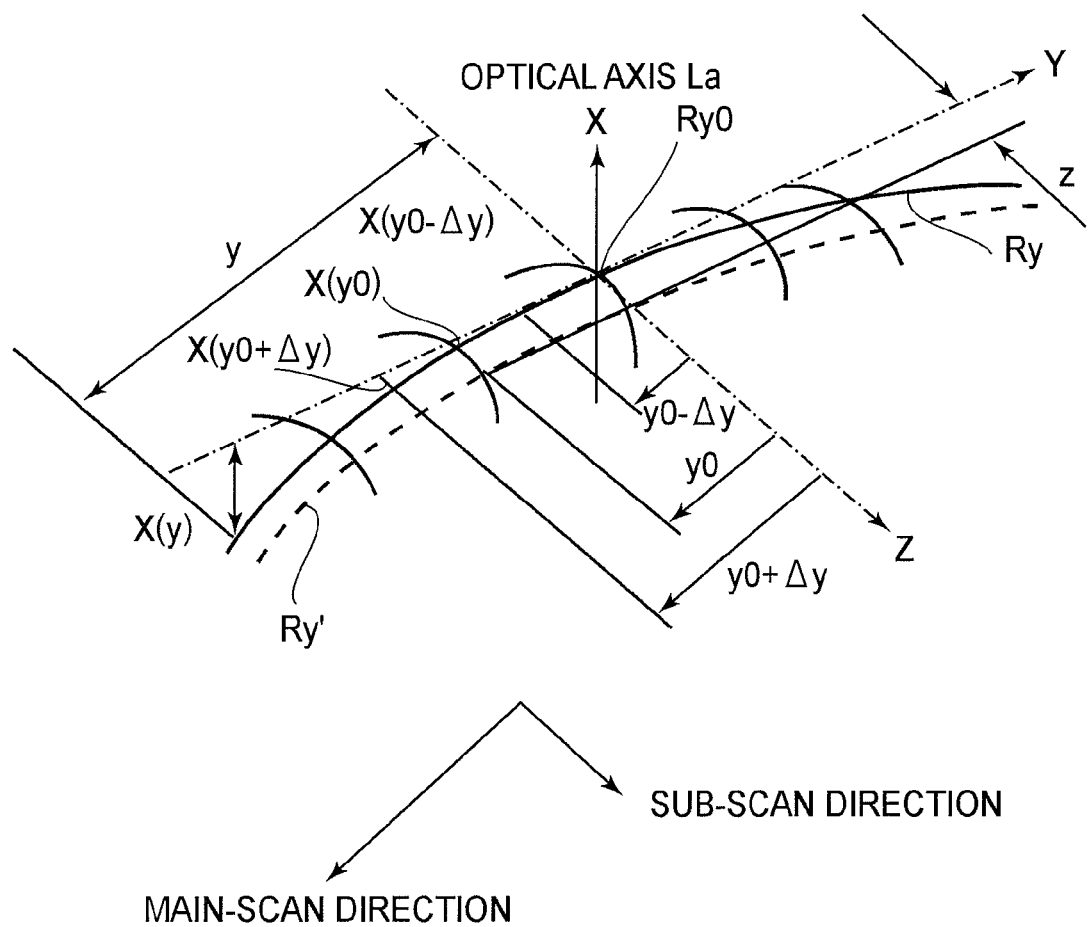
FIG. 2A is a diagram for explaining the lens shape in the main-scan direction at a position decentered in the sub-scan direction relative to the meridional.

Now, a model of the lens surface as shown in FIG. 2A is considered.

Figure 2B:
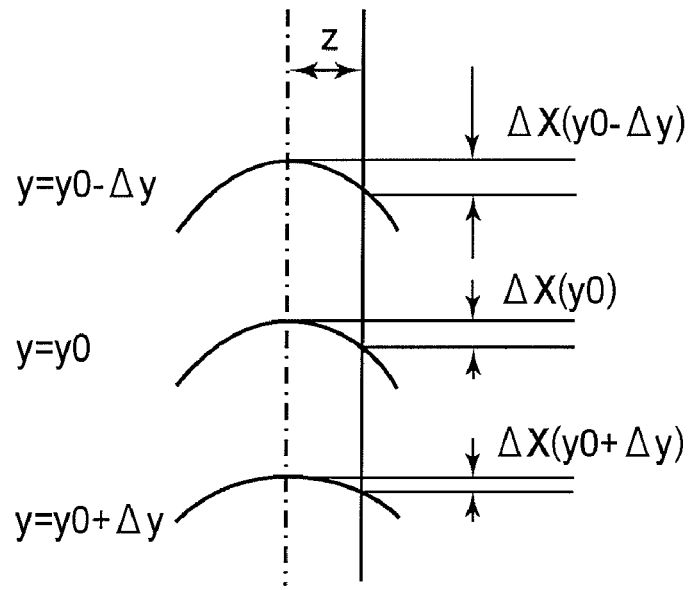
FIG. 2B is a diagram for explaining the lens shape in the main-scan direction at a position decentered in the sub-scan direction relative to the meridional.
Figure 2C:
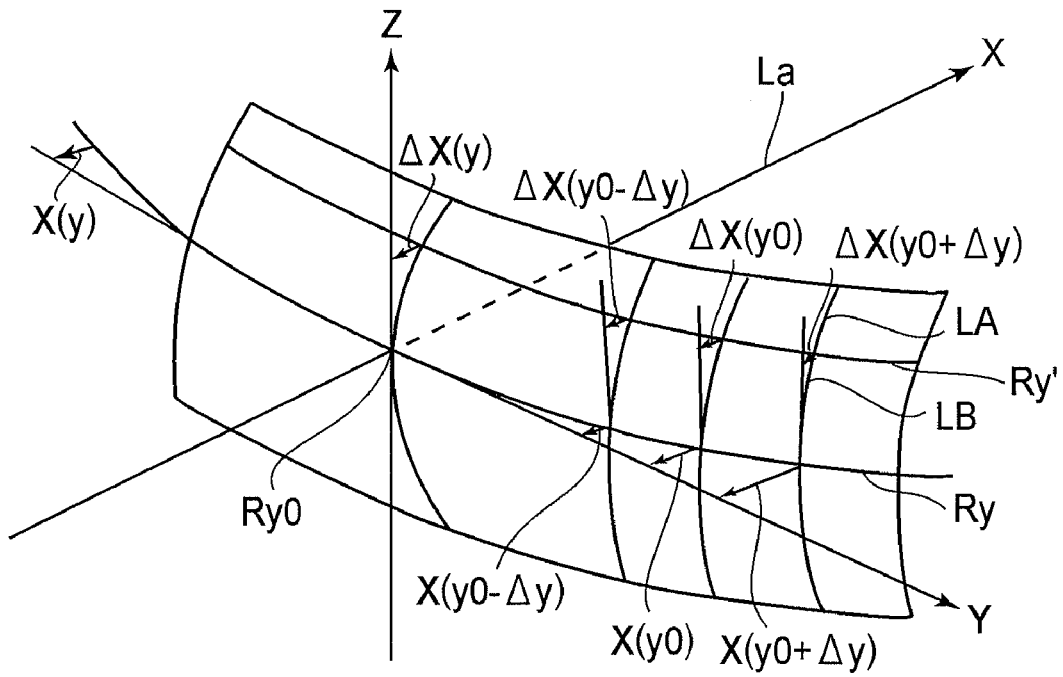
FIG. 2C is a perspective view of the lens shape shown in FIG. 2A.

FIG. 2C is a perspective view of the lens model of FIG. 2A.

The sag amount to the surface vertex Ry0 at the meridional Ry including the optical axis La of the lens surface is taken as X(y).

Here, in FIG. 2A, y denotes the coordinate in the main-scan direction where the coordinate of the surface vertex Ry0 is taken as 0 (zero).

The sag amounts at positions spaced by small amounts +Δy and −Δy in the main-scan direction with respect to the coordinate y0 (>0) in the main-scan direction, are denoted by X(y0+Δy) and X(y0−Δy), respectively.

Furthermore, the sag amounts at coordinates spaced apart in the sub-scan direction are defined by the curvature radius in the sub-scan direction.

Now, a surface having a positive curvature radius in the main-scan direction and the sub-scan direction is considered. There is a relation between the sag amounts at the meridional Ry, such as follows.

$$|X(y0-\Delta y)| < |X(y0)| < |X(y0+\Delta y)| \tag{1}$$

Here, as shown in FIG. 2B, the sag amount to the meridional Ry at a position spaced by a distance z in the sub-scan direction is taken as ΔX(y0).

Then, the curvature radius (curvature radius of the sagittal) in the sub-scan direction becomes loosened more at the lens peripheral edge portion (Y-axis direction) than at the optical axis La.

Therefore, at the position spaced by a distance z in the sub-scan direction, the sag amount to the meridional Ry satisfies the following relation, as seen in FIG. 2B.

$$|\Delta X(y0-\Delta y)| > |\Delta X(y0)| > |\Delta X(y0+\Delta y)| \tag{2}$$

Thus, as depicted by a dotted line in FIG. 2A, with respect to the meridional shape Ry of the lens surface, the change of the main-scan shape Ry' at the position spaced in the sub-scan direction is smaller at the lens peripheral edge portion (Y-direction) than at the optical axis La.

Therefore, the curvature radius of the shape Ry' in the main-scan direction at a position (Z-direction) spaced apart from the optical axis La in the sub-scan direction is more loosened than the curvature radius of the meridional Ry at the optical axis La (i.e., Ry<Ry') and, thus, it is seen that the power in the main-scan has decreased.

In other words, the scan magnification in the main-scan direction has increased than when it passed the meridional Ry.

It is seen therefore that the light beam passing through a position spaced apart from the meridional Ry of the lens surface in the sub-scan direction irradiates, when the same is incident on the photosensitive drum surface 8, a position extended in the main-scan direction as compared with the position where the light beam passed through the meridional Ry of the lens surface is incident on the photosensitive drum surface 8.

For the reasons mentioned above, when multiple beams spaced apart from each other in the sub-scan direction pass, due to the difference in the scan magnification resulting from the difference in the positions in the sub-scan direction where these light beams pass through the lens surface, the positions in the main-scan direction on the photosensitive drum 8 are different, and this causes jitter.

Furthermore, this tendency is more remarkable for a lens having a strong power in the sub-scan direction.

Here, it is to be noted that the jitter in the main-scan direction caused in the oblique incidence optical system will hereinafter be referred to also as "oblique incidence optical system jitter".

On the other hand, the jitter caused when multiple beams are obliquely incident on the photosensitive drum surface 8, will be explained with reference to FIG. 3.

The light beam LA emitted from the light emitting member 1-1 of the light source means 1 is incident on the photosensitive drum surface 8 at a maximum scan angle α at the image end portion, and an incidence angle $\theta_0$ (mean angle as plural light beams are incident) with respect to a surface normal to the photosensitive drum surface 8.

Here, the maximum scan angle is defined as a maximum angle in the main-scan direction as the light is incident on the photosensitive drum.

On the other hand, the light beam LB from the light emitting member 1-2 of the light source means 1 is emitted from the light source means 1 through the same light beam locus as the light beam LA, and it is adjusted and incident to define a laser beam spacing L upon the photosensitive drum surface 8 which spacing has been set in accordance with a particular resolution.

Figure 3:
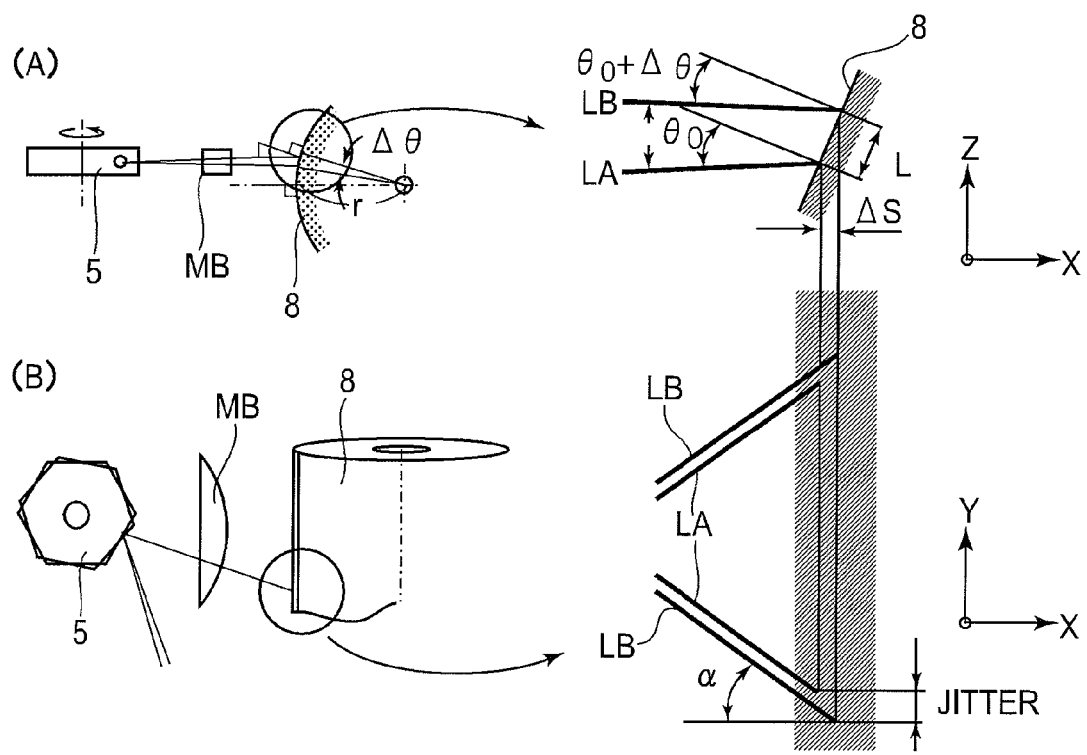
FIG. 3 is a schematic diagram for explaining the drum oblique incidence jitter.

Here, due to the influence of the curvature of the photosensitive drum surface 8, the light beam LB arrives at the photosensitive drum surface 8 with a spacing ΔS in the X-direction from the light beam LA as shown in part (A) of FIG. 3.

Thus, as shown in past (B) of FIG. 3, in the image there occurs an outward picture element deviation of ΔS·tan α in the main-scan direction (Y-direction).

Here, the incidence angle in the sub-scan direction of the light beam LB with respect to a surface normal to the photosensitive drum surface 8 is $\theta_0 + \Delta\theta$ as shown in part (A) of FIG. 3.

Namely, if a plurality of light beams are incident on the photosensitive drum surface 8, the larger the angle of the light beam in sub-scan direction with respect to the surface normal of the photosensitive drum is large, the larger the outward deviation of the picture element is.

Here, the mount of spacing ΔS in the X-direction can be expressed by an equation below, where the radius of the photosensitive drum surface 8 is denoted by r.

$$\Delta S = r \cos \theta_0 - r \cos(\theta_0 + \Delta\theta) \tag{3}$$

Here, if the pitch in the sub-scan direction upon the photosensitive drum surface 8 is denoted by L, from $\Delta\theta = L/r$, it follows that:

$$\Delta S = r\cos\theta_0 - r\cos(\theta_0 + L/r) \tag{4}$$
$$= r\cos\theta_0 - r\cos\theta_0 \cos L/r + r\sin\theta_0 \sin L/r$$

Here, since L/r is very small, the deviation amount ΔS can be approximated as follows.

$$\Delta S \cong L \sin \theta_0 \tag{5}$$

Thus, it is seen that, from ΔS·tan α, there occurs a picture element deviation of an amount ΔP=L sin $\theta_0$·tan α.

Namely, the picture element deviation amount ΔP is:

$$\Delta P = L \sin \theta_0 \cdot \tan \alpha \tag{6}$$

Thus, if α and L are fixed by the optical system, by changing $\theta_0$, the picture element deviation amount ΔP (hereinafter, "drum oblique incidence jitter") can be controlled.

On the other hand, the amount of jitter caused in the previously described oblique incidence optical system is fixed by the optical system.

Thus, by setting the incidence angle $\theta_0$ in the sub-scan direction with respect to the surface normal of the photosensitive drum surface 8 at a predetermined value, the total jitter amount can be controlled.

Based on this, by optimizing the orientation of the incidence angle $\theta_0$ as the light beam LA and the light beam LB are incident on the photosensitive drum surface 8 as well as the magnitude of the incidence angle $\theta_0$, it is possible to generate a drum oblique incidence jitter in a direction correcting the jitter to be caused by the oblique incidence optical system.

Figure 4:
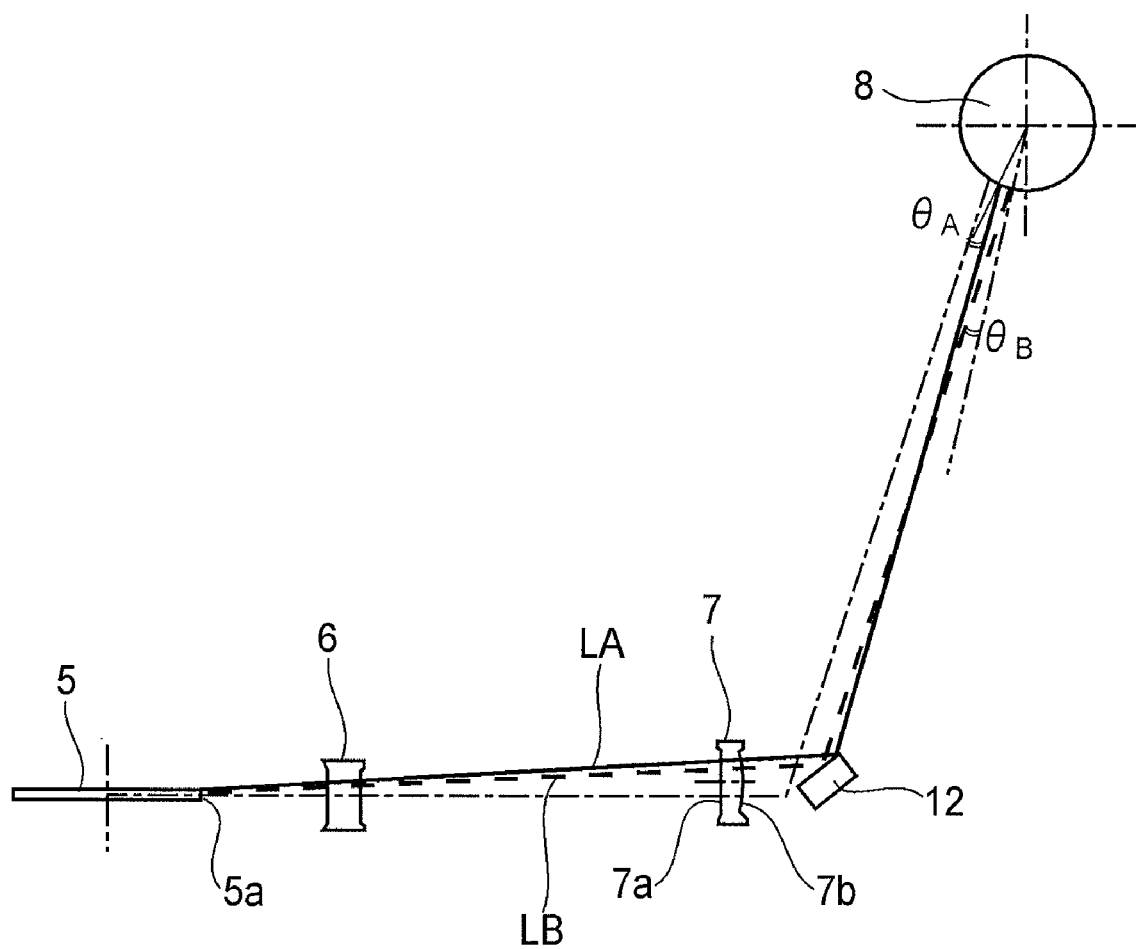
FIG. 4 is a schematic diagram for explaining the manner of returning the light path to reduce the jitter.

Referring to FIG. 4, the picture element deviation amount ΔP will be described in detail.

In FIG. 4, it is assumed that, when the light beam LA (solid line in FIG. 4) and the light beam LB (dotted line in FIG. 4) pass through the lens surface 7b having a strongest power in the sub-scan direction, the light beam LA passes through a position farther from the meridional of the lens surface than the light beam LB (see FIG. 2C).

Here, from the reason described hereinbefore, since the scan magnification of the light beam LA becomes larger than the scan magnification of the light beam LB, the light beam LA bears an outward picture element deviation as compared with the irradiation position of the light beam LB on the photosensitive drum surface 8.

In consideration of this, the photosensitive drum 8 may be so disposed that the incidence angle $\theta_A$ in the sub-scan direction of the light beam LA with respect to the surface normal of the photosensitive drum surface 8 becomes smaller than the incidence angle $\theta_B$ in the sub-scan direction of the light beam LB.

If this is done, due to the difference of the incidence angle on the photosensitive drum surface 8 in the sub-scan direction, the light beam LA generates an inward picture element deviation relative to the irradiation position of the light beam LB.

Thus, the tendencies of picture element deviations to be generated by these two factors will be in a mutually cancelling relationship. As a result, the jitter to be caused upon the photosensitive drum surface 8 can be reduced.

Now, the amount of jitter produced in an oblique incidence optical system (deviation amount in the main-scan direction produced due to the passage of light beams through the positions spaced apart from each other in the sub-scan direction) is denoted by $\Delta J$ (mm).

Here, if the sum of the jitter amount $\Delta J$ and the drum oblique incidence jitter (picture element deviation amount $\Delta P$) is not greater than $\frac{1}{10}$ of the pitch L in the sub-scan direction, it is desirable since the jitter amount is no more recognizable by human eyes.

Namely, with respect to the resolution (pixel density) DPI, the pitch L in the sub-scan direction will become 25.4 DPI (mm). Hence, from $L=25.4/DPI$ (mm)

$|\Delta J + \Delta P| \leq \frac{1}{10} \cdot L$ $|\Delta J + L \cdot \sin \theta_0 \cdot \tan \alpha| \leq \frac{1}{10} \cdot L$ it follows that the incidence angle of the light beam on the photosensitive drum surface 8 should desirably be determined to satisfy the following relation.

$|\Delta J \times DPI/25.4 + \sin \theta_0 \tan \alpha| \leq 0.1$ (6)

Table 1 and Table 2 show numerical values of the optical system according to the first embodiment of the present invention.

In the present embodiment, as shown in Table 1 and Table 2, at the second surface (light exit surface) of the toric lens 7 the curvature in the sub-scan direction continuously changes from the axial position toward the abaxial position, in the effective region.

The second surface is the lens surface 7b having a largest power in the sub-scan direction.

It should be noted that the surface where the curvature in the sub-scan direction continuously changes is not limited to the second surface of the toric lens 7, but it may be any other surface or, alternatively, a plurality of surfaces may be chosen for this.

Figure 5:
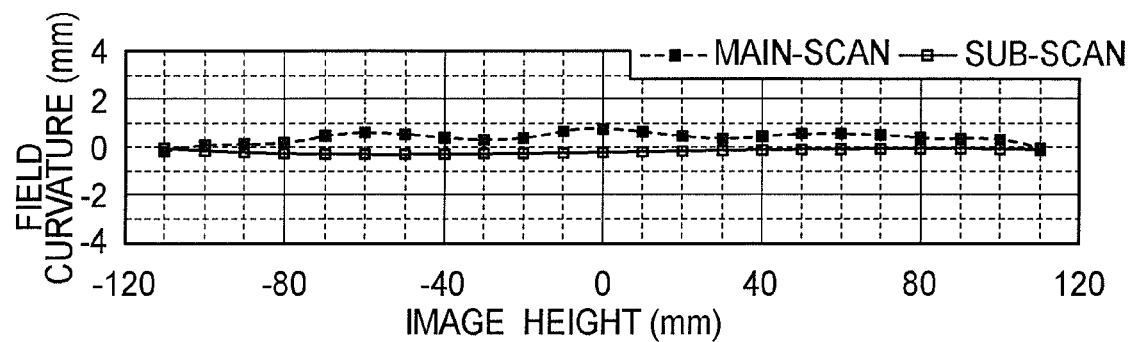
FIG. 5 is a graph illustrating the field curvature in the first embodiment of the present invention.
Figure 6:
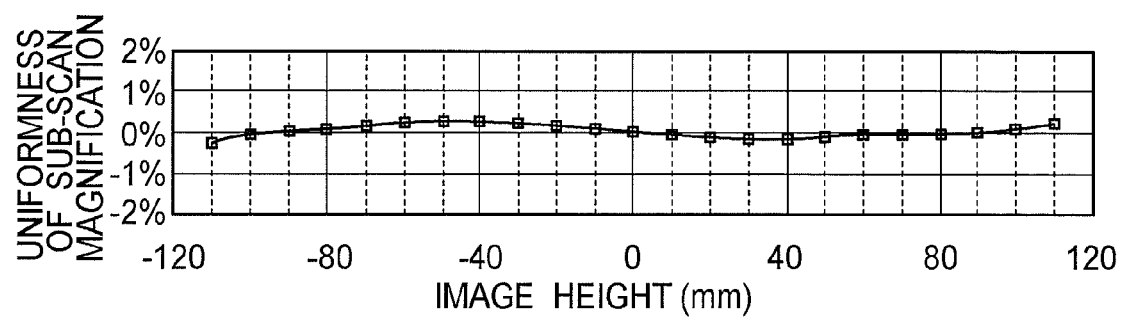
FIG. 6 is a graph illustrating the uniformity of sub-scan magnification in the first embodiment of the present invention.

FIG. 5 shows the field curvature on the scan surface, in the optical system of the first embodiment. FIG. 6 shows the uniformness of the sub-scan magnification, in the optical system of the first embodiment.

Figure 7:
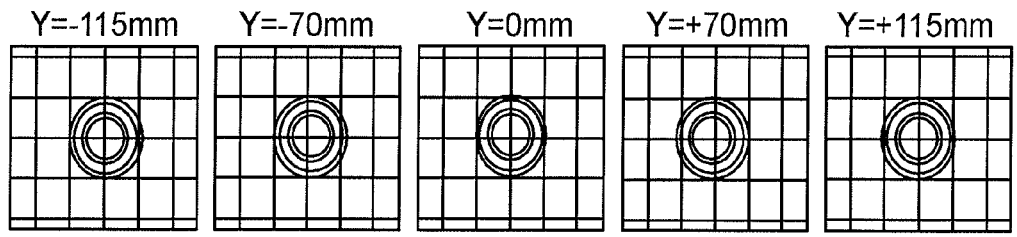
FIG. 7 is a schematic diagram showing the spot shapes on the scan surface, in the first embodiment of the present invention.

FIG. 7 shows spot shapes on the scan surface, in the optical system of the first embodiment (namely, contours of 5%, 10%, 13.5%, 36.8% and 50% to the peak light quantity).

The surface shape of the refracting surface of the toric lens 6 and toric lens 7 as the imaging optical elements in the present embodiment can be presented by the following shape expressions.

When point of intersection between each lens surface and the optical axis is taken as an origin, the optical axis direction is taken as an x-axis, an axis orthogonal to the optical axis in the main-scan section is taken as a y-axis, and an axis orthogonal to the optical axis in the sub-scan section is taken as a z-axis, the meridional direction corresponding to the main-scan direction is given by:

$$x = \frac{y^2/R}{1 + \sqrt{1 - (1+k)y^2/R^2}} + B_4 y^4 + B_6 y^6 + B_8 y^8 + B_{10} y^{10} \quad (7)$$

wherein R is the curvature radius, and k, $B_4$, $B_6$, $B_8$ and $B_{10}$ are aspherical coefficients.

The sagittal direction corresponding to the sub-scan direction (the direction including the optical axis and orthogonal to the main-scan direction) can be given by:

$$x = \frac{z^2/r'}{1 + \sqrt{1 - z^2/r'^2}} \quad (8)$$

where $r'=r0(1+D_2 Y^2 + D_4 Y^4 + D_6 Y^6 + D_8 Y^8)$

Here, r0 is the sagittal curvature radius on the optical axis, and $D_2$, $D_4$, $D_6$ and $D_8$ are coefficients.

It should be noted that sagittal curvature radius r' off the optical axis is defined within a plane which contains the normal to the meridional at respective positions and which is perpendicular to the main-scan surface.

It is seen from Table 1 and Table 2 that, in the present embodiment, comparing the curvature radii (r in the tables) in the sub-scan direction of the toric lens 6 and the toric lens 7, the sagittal curvature radius of the second surface 7b of the toric lens 7 is tightest.

Namely, the second surface 7b of the toric lens 7 is the lens surface having a largest power in the sub-scan direction (i.e., strong positive power).

Figure 8:
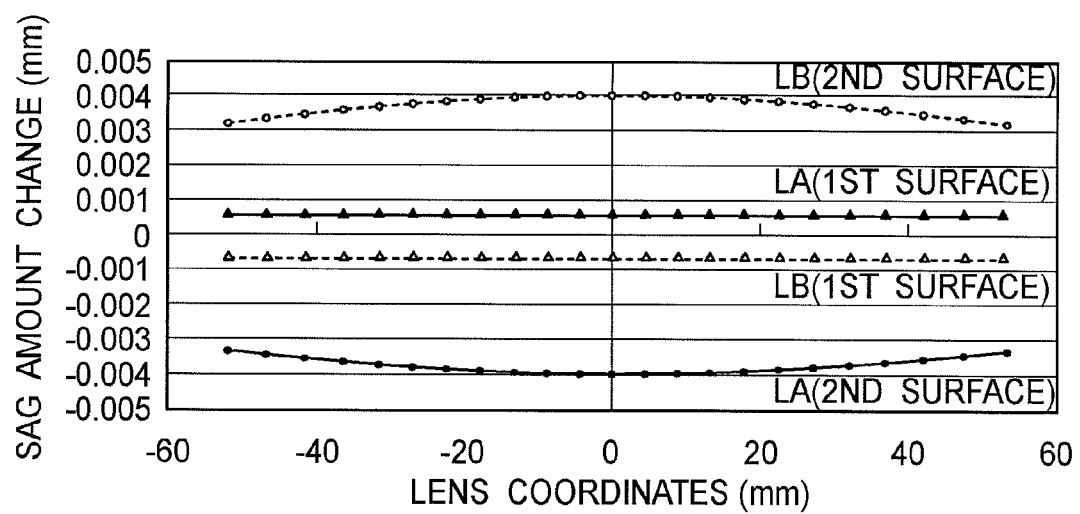
FIG. 8 is a graph illustrating the difference of the sag amount when multiple beams pass through a toric lens, in the first embodiment of the present invention.

Taking this into account, FIG. 8 shows the difference of the sag amount at the light passage point on the first surface 7a and second surface 7b of the toric lens 7, of the light beams LA and LB of the multi-beam laser, compared to the sag amount at the passage point on the first surface 7a and second surface 7b of the toric lens 7, of the light beam of a single-beam laser.

Here, it is assumed that, as compared with the light beam LB, the light beam LA passes through a position largely spaced apart in the sub-scan direction from the meridional of the toric lens 7 as an imaging optical element.

Figure 9A:
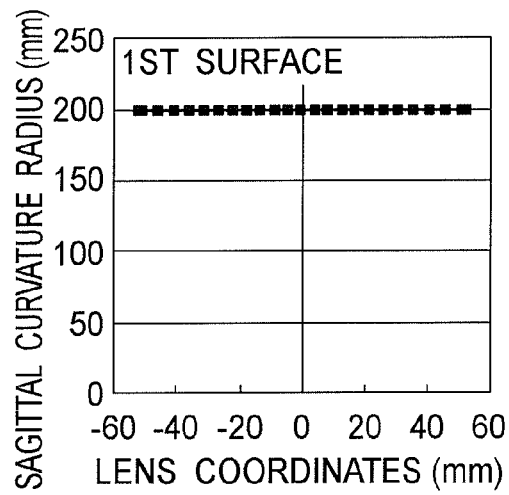
FIGS. 9A and 9B are graphs illustrating the sagittal curvature radius of the surface of the toric lens.
Figure 9B:
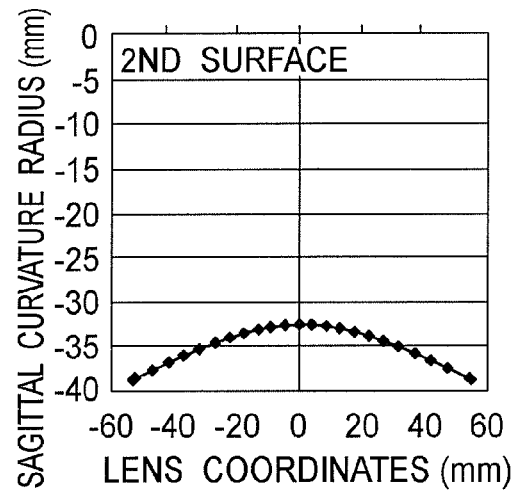

FIG. 9A and FIG. 9B show the curvature radius in the sagittal direction of the toric lens 7 as an imaging optical element.

FIG. 9A is a graph illustrating the curvature radius in the sagittal direction of the first surface 7a of the toric lens 7.

FIG. 9B is a graph illustrating the curvature radius in the sagittal direction of the second surface 7b of the toric lens 7 which surface has a largest positive power (strong positive power) in the sub-scan direction.

From FIG. 8 and FIGS. 9A and 9B, it is seen that, for the first surface 7a where the curvature radius of the sagittal is constant in the main-scan direction, the sag amount at the passage point of the light beam from the multi-beam laser changes uniformly as compared with the sag amount at the passage point of the light beam from the single-beam laser. Thus, there is little change of the power.

Next, with regard to the second surface 7b where the sagittal curvature changes in accordance with the main-scan direction, it is seen that there is little change of the sag amount at the abaxial position as compared with the axial position.

This is because, as clearly seen from FIG. 9B, the sagittal curvature of the second surface 7b is loosened at the abaxial position as compared with the axial position.

Furthermore, comparing the sag amounts in the main-scan direction at positions where the light beam LA and the light beam LB pass through, it is seen that the curvature in the main-scan direction is loosened at the position where the light beam LA passes, whereas the curvature in the main-scan direction is tightened at the position where the light beam LB passes.

Thus, the light beam LA which passes through the position where the eccentricity amount in the sub-scan direction relative to the meridional of the toric lens 7 is large has a larger scan magnification in the main-scan direction as compared with the light beam LB.

Figure 10:
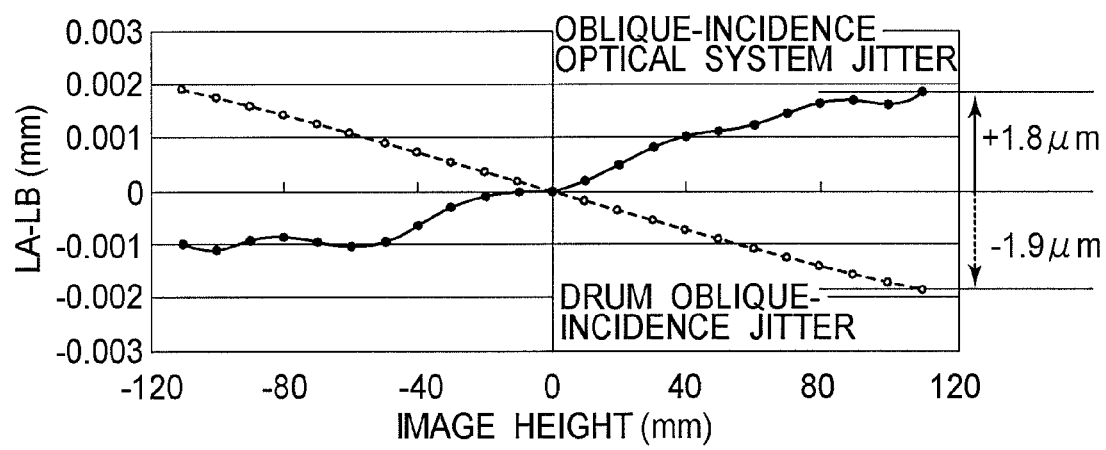
FIG. 10 is a graph illustrating the jitter amount caused in the first embodiment of the present invention.

In FIG. 10, the solid line depicts the difference between the irradiation position in the main-scan direction of the light beam LA on the photosensitive drum surface 8 and the irradiation position in the main-scan direction of the light beam LB, namely, the oblique incidence optical system jitter.

As shown in FIG. 10, the difference in the main-scan direction between the light beam LA and the light beam LB is in a proportional relationship to the image height in the main-scan direction.

As the maximum jitter amount (LA-LB), +1.8 μm is observed.

TABLE 1

Basic Items

| | | |
|---|---|---|
| Used Wavelength | λ (nm) | 790 |
| Scan Angle | θ (deg) | 34.13 |
| f-theta coefficient | f | 188.00 |
| Polygon Circumscribed Circle Radius | R (mm) | 20 |
| No. of Polygon Surfaces | M | 6 |
| Incidence Angle in Sub-Scan Direction | ε (deg) | 2.5 |
| Incidence Angle in Deflecting Direction | γ (deg) | 70 |

Input System Disposition

| | | |
|---|---|---|
| Light Source to Collimator Lens 2 Distance | d1 (mm) | 40.0 |
| Collimator Lens 2 Center Thickness | d2 (mm) | 3.0 |

TABLE 1-continued

| | | |
|---|---|---|
| Collimator Lens 2 to Cylindrical Lens 4 Distance | d3 (mm) | 5.0 |
| Cylindrical Lens 4 Center Thickness | d4 (mm) | 3.0 |
| Cylindrical Lens 4 to Deflection Surface Distance | d5 (mm) | 110.0 |
| Collimator Lens 2 Refractive Index | n1 | 1.76167 |
| Cylindrical Lens 4 Refractive Index | n2 | 1.52397 |

| | Meridional R | | Sagittal r | |
|---|---|---|---|---|
| | 1st Surface | 2nd Surface | 1st Surface | 2nd Surface |
| Collimator Lens 2 | infinite | −30.47 | — | — |
| Cylindrical Lens 4 | infinite | infinite | 57.64 | infinite |

TABLE 2

Design Data

Wavelength/Refractive Index

| | | |
|---|---|---|
| Used Wavelength | λ (mm) | 790 |
| Toric Lens 6 Refractive Index | ndt1 | 1.53064 |
| Toric Lens 6 Abbe No. | vdt1 | 55.5 |
| Toric Lens 7 Refractive Index | ndt2 | 1.53064 |
| Toric Lens 7 Abbe No. | vdt2 | 55.5 |

Light Ray Angle

| | | |
|---|---|---|
| Polygon Incidence Angle | θ p | −70.0 |
| Polygon Maximum Emission Angle | θ e | 33.5 |

Disposition

| | | |
|---|---|---|
| Polygon Surface to Toric Lens 6 | e1 | 26.0 |
| Toric Lens 6 Center Thickness | d1 | 6.0 |
| Toric Lens 6 to Toric Lens 7 | e2 | 63.0 |
| Toric Lens 7 Center Thickness | d2 | 4.0 |
| Toric Lens 7 to Scan Surface | sk | 121.0 |
| Polygon Axis to Scan Surface | L | 220.0 |
| Effective Scan Width | W | 220.0 |

| | Toric Lens 6 Shape | | Toric Lens 7 Shape | |
|---|---|---|---|---|
| | 1st Surface | 2nd Surface | 1st Surface | 2nd Surface |
| R | −4.68051E+01 | −3.15608E+01 R | −7.07800E−02 | 9.66600E+02 |
| k | −1.34744E+01 | −1.64469E−01 k | | 1.89336E+02 |
| B4 | −1.32053E−05 | 2.76298E−06 B4 | | −5.03807E−07 |
| B6 | 3.37229E−08 | 2.27125E−10 B6 | | 4.82784E−11 |
| B8 | −4.27361E−11 | 1.71134E−11 B8 | | −2.30850E−15 |
| B10 | 1.44495E−14 | −2.29067E−14 B10 | | −3.61173E−19 |
| r | 1000 | 1000 r | 1.98083E+02 | −3.25044E+01 |
| D2 | | D2 | | 1.05893E−04 |
| D4 | | D4 | | −2.25372E−08 |
| D6 | | D6 | | 4.12482E−12 |
| D8 | | D8 | | −3.12852E−16 |

Y-axis Symbol "+" means the side remore from laser.

In order to correct the drum oblique incidence jitter, in this embodiment, the number of reflecting mirrors 12 shown in FIG. 1C and the angle of the reflecting mirrors 12 are adjusted to optimize the angle of light beams directed to the photosensitive drum 8. Details are as follows.

For multiple beams, the light source means 1 is rotated relative to the optical axis so that the spacing (scan line spacing) of the light beams LA and Lb in sub-scan direction upon the photosensitive drum surface 8 matches a predetermined pitch, thereby to adjust the positions of the light emitting member 1-1 and the light emitting member 1-2.

In this embodiment, the light source means 1 is rotated by 4.9 degrees relative to the optical axis to meet the resolution of 600 dpi.

Furthermore, the orientation of the reflecting mirror 12 is changed in accordance with the rotational direction of the light source means 1, so that the light beam LA precedes the light beam LB with respect to the rotational direction of the photosensitive drum 8.

Still further, the position of the photosensitive drum 8 is so determined that the light beam LB has a larger scan magnification than the light beam LA, in other words, the light beam LB has a longer optical path length than the light beam LA.

In this embodiment, as shown in FIG. 3A, with respect to the surface normal of the photosensitive drum surface 8, the light beam LA is incident on the photosensitive drum surface 8 with an orientation of $\theta_A=\theta_0=5.3$ degrees, while the light beam LB is incident with an orientation of $\theta_B=\theta_0+\Delta\theta=5.5$ degrees.

If the light beams are incident with these angles, the optical path length of the light beam LB becomes longer by around 0.004 mm than the light beam LA.

Here, the dotted line in FIG. 10 depicts the difference between the irradiation position in the main-scan direction of the light beam LA upon the photosensitive drum surface 8 and the irradiation position in the main-scan direction of the light beam LB, namely, the drum oblique incidence jitter.

As shown in FIG. 10, the difference in the main-scan direction between the light beam LA and the light beam LB is in a proportional relationship with the image height in the main-scan direction. As regards the jitter amount (LA-LB) resulting from the oblique incidence onto the photosensitive drum surface 8, $-1.9$ μm is observed.

Thus, the jitter (oblique incidence optical system jitter) caused in an oblique incidence optical system and the jitter (drum oblique incidence jitter) caused by the oblique incidence onto the photosensitive drum surface 8 are in a mutually cancelling (offset) relationship. As a result, there remains only a jitter of $-0.1$ μm.

If the resolution is 600 dpi, the spacing in the sub-scan direction between the light beam LA and the light beam LB is 25.4 mm/600=42.3 μm. Since the amount of jitter in the present embodiment is not greater than 1/10 of the dot spacing which is assumed for 600 dpi, visually there is little influence.

In the present embodiment, the amount of jitter $\Delta J$ in the main-scan direction, the pixel density DPI, the mean value $\theta_0$ of angles as a plurality of light beams are incident with respect to the surface normal of the photosensitive drum, and the value of maximum angle $\alpha$ in the main-scan direction as the light beam passed through the imaging optical system is incident on the photosensitive drum, are as follows.

$\Delta J=0.002$ mm
DPI=600 dpi
$\theta_0=5.3$ degrees
$\alpha=25.2$ degrees

Substituting these parameter values into conditional expression (6), the left-hand side is:

Left-hand side=0.0038 and this satisfies conditional expression (6).

In conditional expression (6), since the focal length of the imaging optical system MB is not less than 100 mm and not greater than 300 mm, the value that can be taken by the angle $\alpha$ is around 20 degrees to 35 degrees.

Furthermore, the angle $\theta_0$ should preferably be not less than 5 degrees and not greater than 15 degrees since in that case, due to the compactification of the drum diameter, there will be little influence of decentration.

Although the present embodiment has been described with reference to an example where the imaging optical system MB is comprised of a dioptric system of refractive lens as an imaging optical element, the same applied to a case where the imaging optical system is comprised of a catoptric system such as a mirror.

In a system in which the curvature in the sub-scan direction of the mirror changes continuously from an axial position to an abaxial position, like the lens, the larger the spacing from the meridional of the passage position of plural light beams projected on the mirror is, the larger the deviation of the picture element in the main-scan direction is.

Hence, by adjusting the incidence angle upon the photosensitive drum surface 8, the jitter in the main-scan direction can be reduced.

In the present embodiment as described above, the jitter caused in an oblique incidence optical system and the jitter resulting from oblique incidence upon the photosensitive drum surface 8 are placed in an offset relationship and, by doing so, the jitter in the main-scan direction is corrected.

It should be noted that, although in the present embodiment the imaging optical system is comprised of two pieces of imaging lenses, the invention is not limited to this. It may be comprised of a single imaging lens or, alternatively, three or more imaging lenses, for example.

Furthermore, the imaging optical system may be formed by including a diffractive optical element or an off-axial optical element (free-form surface catoptric element).

Embodiment 2

Figure 11A:
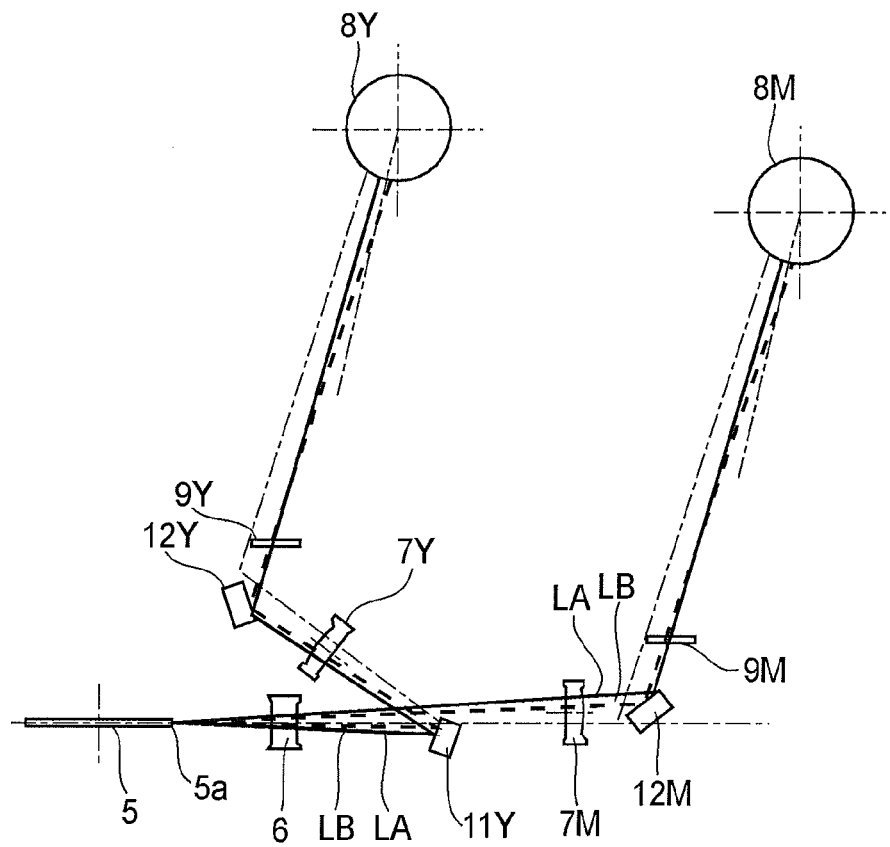
FIG. 11A is a sub-scan sectional view of an imaging optical system according to a second embodiment of the present invention.

FIG. 11A is a sectional view in the sub-scan direction of a main portion of an imaging optical system according to a second embodiment of the present invention.

Figure 11B:
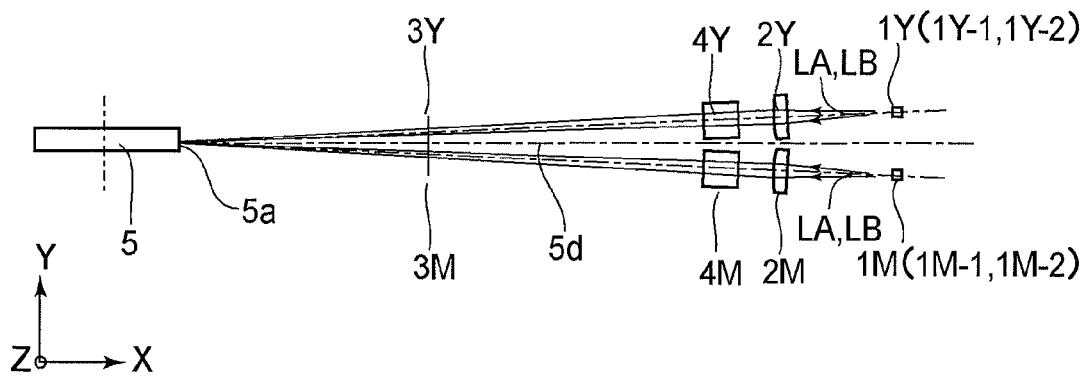
FIG. 11B is a sub-scan sectional view of an input optical system according to the second embodiment of the present invention.

FIG. 11B is a sectional view of a main portion of an input optical system in the sub-scan direction, according to the second embodiment of the present invention.

In FIGS. 11A and 11B, like numerals are assigned to components corresponding to those of FIGS. 1A and 1B.

The present embodiment differs from the aforementioned first embodiment in that two photosensitive drums 8Y and 8M are juxtaposed and components are arranged accordingly to meet high-speed multicolor printing.

It is to be noted that, in the present embodiment, while not shown in the drawings, this structure is used in combination with another similar structure so that the multicolor printing can be done by four photosensitive drums.

The structure and optical function of the remaining portion are similar to the first embodiment, and hence similar advantageous results are obtained.

More specifically, in FIG. 11B, denoted at 1Y and 1M are light source means, respectively, each comprising a semiconductor laser (laser source), for example.

Each of the semiconductor lasers 1Y and 1M includes two light emitting members (laser light emitting members) 1Y-1 and 1Y-2; and 1M-1 and 1M-2 (monolithic multi-beam laser).

Denoted at 2Y and 2M are collimator lenses, respectively, which serve to transform two divergent light beams LA and LB emitted from the light source means 1Y and 1M, each into a parallel light beam.

Denoted at 4Y and 4M are cylindrical lenses, respectively, having a refracting power (power) only in the sub-scan direction (in the sub-scan section).

Denoted at 3Y and 3M are aperture stops which serve to regulate the beam profile of the two light beams LA and LB from the cylindrical lenses 4Y and 4M, respectively.

In the present embodiment, the two divergent light beams LA and LB emitted from the light source means 1Y and 1M, respectively, are transformed into parallel light beams by associated collimator lenses 2Y and 2M, respectively.

Then, the thus transformed light beams are imaged by associated cylindrical lenses 4Y and 4M, respectively, as elongated line images on the deflecting surface 5a of the polygon mirror (optical deflector) 5 in the main-scan direction.

Furthermore, the two light beams LA and LB passed through the cylindrical lenses 4Y and 4M go through associated aperture stops 3Y and 3M, respectively, by which the light beam width is restricted.

In this embodiment, in the sub-scan section, the optical axes of the collimator lenses 2Y and 2M as well as the optical axes of the cylindrical lenses 4Y and 4M are tilted with respect to a normal 5d to the deflecting surface 5a of the polygon mirror 5.

With this arrangement, the two light beams LA and LB emitted from the respective light source means 1Y and 1M are incident (oblique incidence) on the deflecting surface 5a of the polygon mirror 5, with an angle in an oblique direction with respect to the sub-scan direction (oblique incidence optical system).

Then, a plurality of (four) light beams scanningly deflected by the deflecting surface 5a of the polygon mirror 5 go through a common toric lens (first imaging lens) 6 and, after this, these are separated by the reflecting mirror 11Y.

The light beams LA and LB being separated into two pairs pass through associated toric lenses (second imaging lenses) 7Y and 7M, respectively, and after that, these light beams are turned around by associated reflecting mirrors 12Y and 12M, respectively. Then, these are imaged in the shape of a spot on associated photosensitive drums (scan surfaces) 8Y and 8M, respectively.

Then, by rotating the polygon mirror 5 in a predetermined direction, the photosensitive drum surfaces 8Y and 8M are optically scanned. Thus, two scanning lines corresponding to the two light beams LA and LB are defined thereon, whereby imagewise information is recorded thereon.

The aforementioned toric lens 6 and the toric lenses 7Y and 7M are configured to define a conjugate relationship between the deflecting surface 5a of the polygon mirror 5 and the photosensitive drum surfaces 8Y and 8M, in the sub-scan section, thereby to provide the tilt compensation function.

In this embodiment, in order to reduce the number of reflecting mirrors used and also to make uniform the direction of the scan line bend resulting from the shape dispersion of toric lenses 6, 7Y and 7M or deformation thereof due to any environmental variation, the components are set as follows.

More specifically, in this embodiment, the difference in the number of used reflecting mirrors between the light path toward the photosensitive drum surface 8Y and the light path toward the photosensitive drum surface 8M is set to be an odd number.

Figure 12:
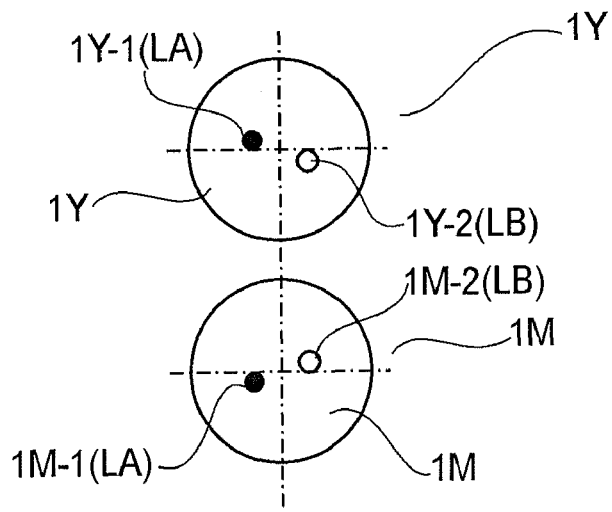
FIG. 12 is a schematic diagram for explaining the rotational direction of a laser in the second embodiment of the present invention.

Here, with regard to the photosensitive drum 8Y and the photosensitive drum 8M, the direction of rotation of the light source means 1Y and the direction of rotation of the light source means 1M are made different, as shown in FIG. 12, so as to ensure that the printing by the light beam LA (scanning line) always precedes the light beam LB (scanning line) with respect to the rotational direction of the photosensitive drum.

In this embodiment, in accordance with the difference in number of the reflecting mirrors disposed along the respective light paths, the direction of rotating the respective light source means 1Y and 1M around the optical axis is determined.

Furthermore, the light beams LA and LB incident on the photosensitive drums 8Y and 8M, respectively, are set to be incident at an exactly the same order with respect to the direction of rotation of the photosensitive drums 8Y and 8M.

Yet further, the disposition of the reflecting mirrors 12Y and 12M is so optimized that the light beam LA (solid line in FIG. 11A) and the light beam LB (dotted line in FIG. 11A) take the same incidence angle with respect to the surface normal of associated photosensitive drum surfaces 8Y and 8M, respectively.

When light beams are obliquely incident on the toric lens 6 and toric lenses 7Y and 7M, there occurs jitter in the main-scan direction in the light beam LA and light beam LB emitted from the light source means 1Y and 1M, respectively, as described hereinbefore.

However, since in the present embodiment the direction of rotation of the light source means 1Y and 1M is determined so that, on the photosensitive drum surfaces 8Y and 8M, the light beam LA always precedes the light beam LB, the jitter in the main-scan direction to be caused by the light beam LA relative to the light beam LB is assuredly constant.

Therefore, by optimizing the incidence angles of the light beams LA and Lb with respect to the surface normal of the photosensitive drum surfaces 8Y and 8M, the jitter in the main-scan direction caused in the oblique incidence optical system can be cancelled in the same direction.

It should be noted that the present embodiment has been described with reference to an example wherein the difference in the number of reflecting mirrors used in the respective light paths is made an odd number, the invention is not limited to this.

For example, even if it is an even number, by making the rotations of the light source means 1Y and the light source means 1M in the same direction and by optimizing the incidence angles of the light beam LA and the light beam LB with respect to the surface normal of the photosensitive drum surfaces 8Y and 8M, the jitter in the main-scan direction caused in an oblique incidence optical system can be cancelled in the same direction.

As described hereinbefore, by determining the rotational directions of the light source means 1Y and 1M as well as the positions of the photosensitive drums 8Y and 8M as desired, in accordance with the number of reflecting mirrors used, in both of the photosensitive drums 8Y and 8M the jitter can be reduced similarly.

Thus, a color drift to be caused when four colors are overlaid can be reduced, and a good print quality can be achieved.

Embodiment of Image Forming Apparatus

Figure 13:
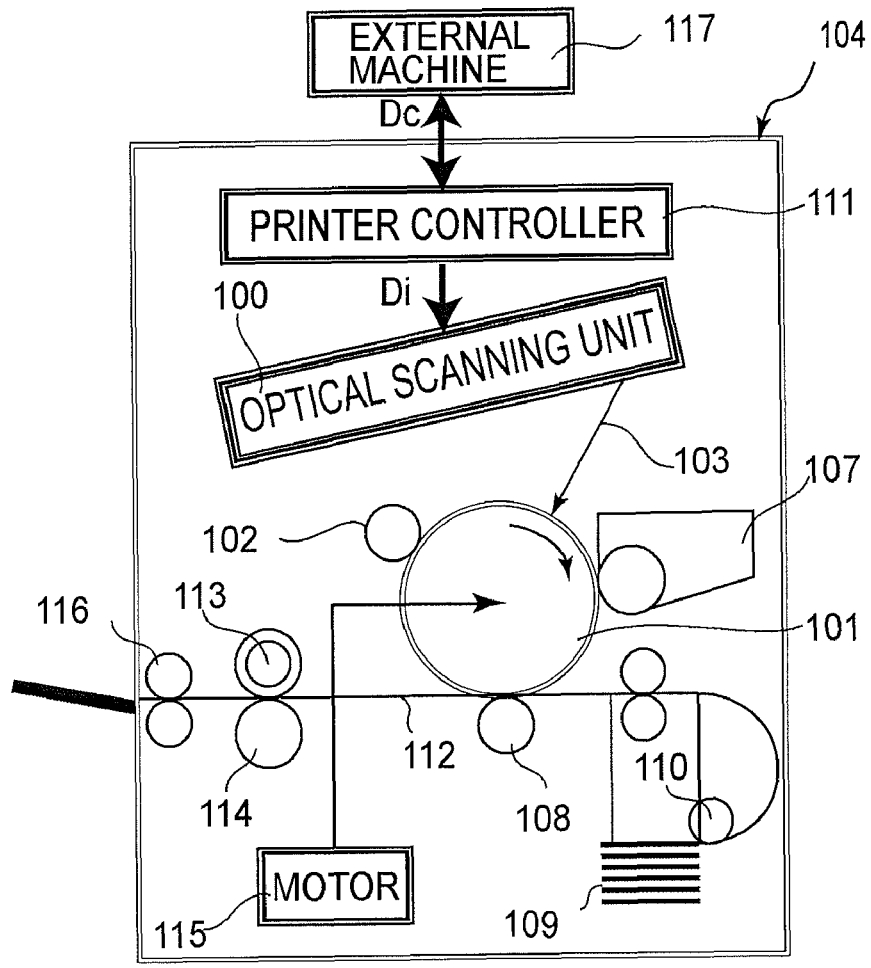
FIG. 13 is a sub-scan sectional view, illustrating an embodiment of an image forming apparatus according to the present invention.

FIG. 13 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 (multi-beam optical scanning device) which is configured in accordance with any one of the preceding embodiments described hereinbefore. The optical scanning unit 100 produces multiple light beams 103 having been modulated in accordance with the imagewise data Di, and with the multiple light beams 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the multiple beams 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the multiple light beams 103 being scanned by the optical scanning unit 100 are projected.

As described above, the multiple light beams 103 have been modulated in accordance with the imagewise data Di. By irradiating the photosensitive drum 101 with the multiple light beams 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 13) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 13) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 13, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

Figure 14:
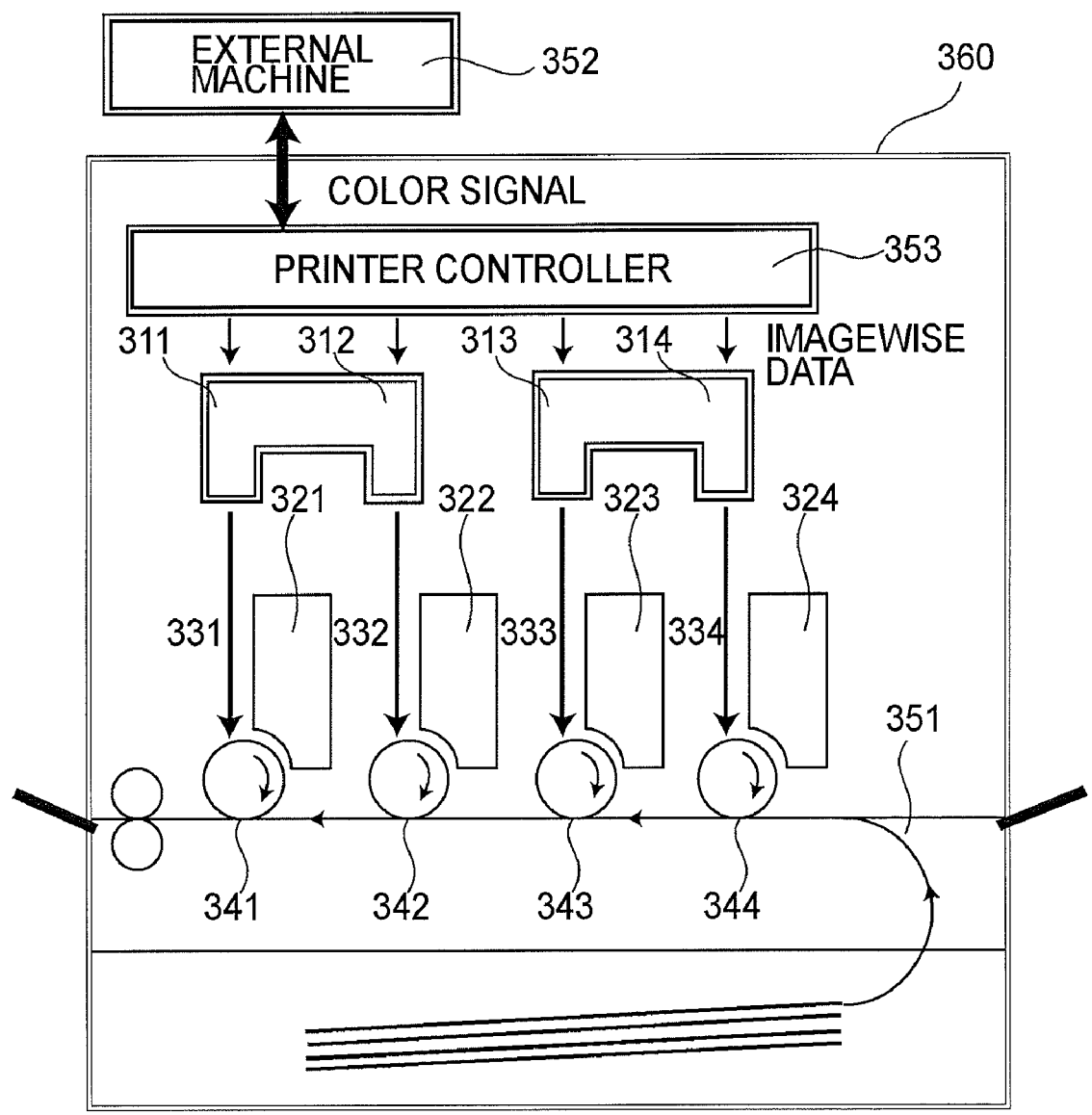
FIG. 14 is a schematic diagram of a main portion of a color image forming apparatus, according to an embodiment of the present invention.
Figure 15:
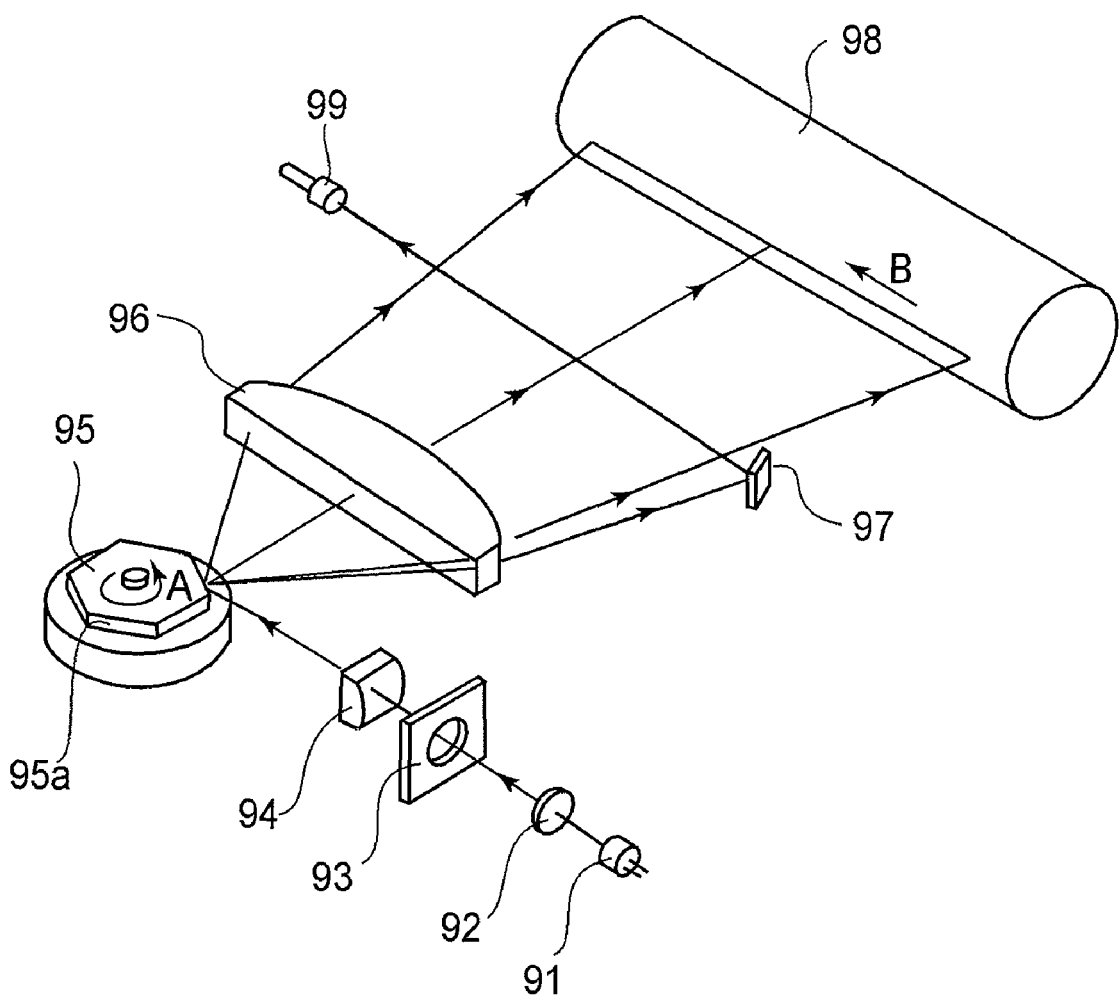
FIG. 15 is a schematic diagram of a main portion of a conventional optical scanning device.

FIG. 14 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 14, denoted generally at 360 is a color image forming apparatus, and denoted at 311, 312, 313 and 314 are multi-beam optical scanning devices having a structure according to any one of the preceding embodiments. Denoted at 341, 342, 343 and 344 are photosensitive drums (image bearing members), and denoted at 321, 322, 323 and 324 are developing devices, respectively. Denoted at 351 is a conveyance belt.

In FIG. 14, the color image forming apparatus 360 receives color signals of R (red), G (green) and B (blue) supplied thereto from an outside machine 352 such as a personal computer, for example. These color signals are transformed by means of a printer controller 353 inside the image forming apparatus, into imagewise data (dot data) corresponding to C (cyan), M (magenta), Y (yellow) and B (black).

These imagewise data are inputted into the multi-beam optical scanning devices 311, 312, 313 and 314, respectively. In response, these optical scanning devices produce multiple light beams 331, 332, 333 and 334 having been modulated in accordance with the associated imagewise data. Through these light beams, the photosensitive surfaces of the photosensitive drums 341, 342, 343 and 344 are scanned in the main-scan direction.

In the color image forming apparatus of this embodiment, two sets of multi-beam optical scanning devices (311; 312) and (313; 324) are provided and these correspond to colors of C (cyan), M (magenta), Y (yellow) and B (black), respectively. These scanning devices are operable in parallel to each other to record imagewise signals upon the surfaces of the photosensitive drums 341, 342, 343 and 344, respectively, so that a color image can be printed at high speed.

T color image forming apparatus of this embodiment uses four multi-beam optical scanning devices to produce latent images for different colors upon the surfaces of corresponding photosensitive drums, respectively, by use of multiple beams based on respective image data. After that, these images are superposedly transferred onto a recording sheet, whereby a single full-color image is produced thereon.

As regards the outside machine 352, a color image reading machine having a CCD sensor, for example, may be used. In that occasion, this color image reading machine and the color image forming apparatus 360 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-295344 filed Nov. 14, 2007, for which is hereby incorporated by reference.

What is claimed is:

1. A multi-beam optical scanning device, comprising:
light source means;
deflecting means configured to scanningly deflect a plurality of light beams emitted from said light source means; and
an imaging optical system configured to image a plurality of light beams scanningly deflected by a deflecting surface of said deflecting means, upon a photosensitive drum,
wherein each of a plurality of light beams incident on an imaging optical element of imaging optical elements constituting said imaging optical system, which imaging optical element has a largest positive power in a sub-scan direction among the imaging optical elements, is deviated in one direction along the sub-scan direction relative to an optical axis of the imaging optical element having a largest positive power in the sub-scan direction, and the plurality of light beams, when they pass through the imaging optical element having a largest positive power in the sub-scan direction, pass through positions which are spaced apart from each other in the sub-scan direction;

wherein at least one surface of the imaging optical element having a largest positive power in the sub-scan direction has a curvature in the sub-scan direction which curvature changes from an axial position toward an abaxial position;

wherein when, among the plurality of light beams passing through the imaging optical element having a largest positive power in the sub-scan direction, a light beam which passes through a position furthermost in the sub-scan direction from a meridional of the imaging optical element having a largest positive power in the sub-scan direction is incident on said photosensitive drum, an incidence angle thereof in the sub-scan direction with respect to a surface normal of said photosensitive drum becomes smallest as compared with the other light beam or beams, and wherein, where a maximum angle in a main-scan direction as the plurality of light beams pass through said imaging optical system and incident on said photosensitive drum is denoted by $\alpha$, a mean of incidence angles in the sub-scan direction as the plurality of light beams are incident with respect to a surface normal of said photosensitive drum is denoted by $\theta_0$, a pixel density is denoted by DPI, an amount of jitter in the main-scan direction caused, when the plurality of light beams pass through the imaging optical element, by the passage of the plurality of light beams through positions which are spaced apart from each other in the sub-scan direction is denoted by $\Delta J$ (mm), a relation $$\left| \Delta J \times \frac{DPI}{25.4 + \sin\theta_0 \tan\alpha} \right| \leq 0.1$$

is satisfied.

2. A multi-beam optical scanning device according to claim 1, wherein, in the sub-scan section, the plurality of light beams incident on the deflecting surface of said deflecting means are incident from an oblique direction with respect to the deflecting surface.

3. A multi-beam optical scanning device according to claim 1, wherein said multi-beam optical scanning device includes a plurality of photosensitive drums and a plurality of light source means corresponding to said plurality of photosensitive drums, respectively, wherein said multi-beam optical scanning device further comprises reflecting mirrors disposed at light paths for directing a plurality of light beams emitted from said plurality of light source means to associated photosensitive drums, respectively, and wherein, in accordance with a difference in the number of reflecting mirrors disposed at the light paths, a direction in which each of said plurality of light source means is rotated around an optical axis is determined.

4. A multi-beam optical scanning device according to claim 3, wherein a plurality of light beams incident on said plurality of photosensitive drums are incident thereon all in the same order with respect to the direction of rotation of the photosensitive drums.

5. A multi-beam optical scanning device according to claim 3, wherein the difference in the number of reflecting mirrors disposed at the light paths is an odd number.

6. An image forming apparatus, comprising:
a multi-beam optical scanning device as recited in claim 1;
the photosensitive member being disposed at a surface to be scanned;
a developing device for developing an electrostatic latent image formed on said photosensitive member with a light beam scanningly deflected by said multi-beam optical scanning device, to produce a toner image;
a transferring device for transferring the developed toner image onto a transfer material; and
a fixing device for fixing the transferred toner image, on the transfer material.

7. An image forming apparatus, comprising:
a multi-beam optical scanning device as recited in claim 1; and
a printer controller for converting code data supplied from an outside machine into an imagewise signal and for inputting the imagewise signal into said optical scanning device.

8. A color image forming apparatus, comprising:
a multi-beam optical scanning device as recited in claim 1; and
a plurality of image bearing members each being disposed at a surface to be scanned by said multi-beam optical scanning device, for forming images of different colors.

9. A color image forming apparatus according to claim 8, further comprising a printer controller for converting a color signal supplied from an outside machine into imagewise data of different colors and for inputting the imagewise data into corresponding multi-beam optical scanning devices.

10. A multi-beam optical scanning device, comprising:
light source means;
deflecting means configured to scanningly deflect a plurality of light beams emitted from said light source means; and
an imaging optical system configured to image a plurality of light beams scanningly deflected by a deflecting surface of said deflecting means, upon a photosensitive drum,
wherein each of a plurality of light beams incident on an imaging optical element constituting said imaging optical system is deviated in one direction along the sub-scan direction with respect to an optical axis of said imaging optical system, and each of the plurality of light beams, when they pass through the imaging optical element, pass through positions which are spaced apart from each other in the sub-scan direction,
wherein at least one surface of the imaging optical element has a curvature in the sub-scan direction which curvature changes from an axial position toward an abaxial position;
wherein when, among the plurality of light beams passing through the imaging optical element, a light beam which passes through a position furthermost in the sub-scan direction from a meridional of the imaging optical element is incident on said photosensitive drum, an incidence angle thereof in the sub-scan direction with respect to a surface normal of said photosensitive drum becomes smallest as compared with the other light beam or beams, and wherein, where a maximum angle in a main-scan direction as the plurality of light beams pass through said imaging optical system and incident on said photosensitive drum is denoted by α, a mean of incidence angles in the sub-scan direction as the plurality of light beams are incident with respect to a surface normal of said photosensitive drum is denoted by $\theta_0$, a pixel density is denoted by DPI, an amount of jitter in the main-scan direction caused, when the plurality of light beams pass through the imaging optical element, by the passage of the plurality of light beams through positions which are spaced apart from each other in the sub-scan direction is denoted by ΔJ (mm), a relation $$\left| \Delta J \times \frac{DPI}{25.4 + \sin\theta_0 \tan\alpha} \right| \leq 0.1$$

is satisfied.

11. An image forming apparatus, comprising:
a multi-beam optical scanning device as recited in claim 10;
the photosensitive member being disposed at a surface to be scanned;
a developing device for developing an electrostatic latent image formed on said photosensitive member with a light beam scanningly deflected by said multi-beam optical scanning device, to produce a toner image;
a transferring device for transferring the developed toner image onto a transfer material; and
a fixing device for fixing the transferred toner image, on the transfer material.

12. An image forming apparatus, comprising:
a multi-beam optical scanning device as recited in claim 10; and
a printer controller for converting code data supplied from an outside machine into an imagewise signal and for inputting the imagewise signal into said optical scanning device.

13. A color image forming apparatus, comprising:
a multi-beam optical scanning device as recited in claim 10; and
a plurality of image bearing members each being disposed at a surface to be scanned by said multi-beam optical scanning device, for forming images of different colors.

14. A color image forming apparatus according to claim 13, further comprising a printer controller for converting a color signal supplied from an outside machine into imagewise data of different colors and for inputting the imagewise data into corresponding multi-beam optical scanning devices.

* * * * *